United States Patent [19]

Kizawa et al.

[11] Patent Number: 4,562,078

[45] Date of Patent: Dec. 31, 1985

[54] PROCESS OF MANUFACTURING BARM FOR BAKERY AND PASTRY PRODUCTS

[75] Inventors: Rikiichi Kizawa, Houya; Shinji Ishigami, Tokyo, both of Japan

[73] Assignee: Nisshin Flour Milling Co., Ltd., Japan

[21] Appl. No.: 506,299

[22] Filed: Jun. 21, 1983

[30] Foreign Application Priority Data

Jun. 30, 1982 [JP] Japan .................................. 57-111658

[51] Int. Cl.$^4$ .......................... A21D 2/00; A23L 1/28; C12G 3/08
[52] U.S. Cl. ......................................... 426/52; 426/7; 426/14; 426/20; 426/44
[58] Field of Search ................... 426/7, 14, 20, 44, 52, 426/61

[56] References Cited

U.S. PATENT DOCUMENTS

| | | | |
|---|---|---|---|
| 1,274,898 | 8/1918 | Kohman | 426/20 |
| 3,527,644 | 9/1970 | Landfried et al. | 426/20 X |
| 4,308,284 | 12/1981 | Noda et al. | 426/52 X |
| 4,423,078 | 12/1983 | Darley et al. | 426/20 |

FOREIGN PATENT DOCUMENTS

| | | | |
|---|---|---|---|
| 96363 | 8/1978 | Japan | 426/7 |
| 186923 | 6/1923 | United Kingdom | 426/20 |
| 207225 | 11/1923 | United Kingdom | 426/20 |
| 289978 | 5/1928 | United Kingdom . | |

*Primary Examiner*—David M. Naff
*Attorney, Agent, or Firm*—Abelman, Frayne, Rezac & Schwab

[57] ABSTRACT

Barm for bakery and pastry products is produced by mixing an alcohol-freed beer solution with Koji and incubating the mixture at a temperature of 20°–30° C. The Koji is prepared by inoculating steamed rice with *Aspergillus oryzae*.

2 Claims, No Drawings

PROCESS OF MANUFACTURING BARM FOR BAKERY AND PASTRY PRODUCTS

FIELD OF THE INVENTION

This invention relates to a process of manufacturing barm for bakery and pastry products.

BACKGROUND OF THE INVENTION

Barm of various types have previously been used as source of flavor for bakery and pastry products. These barm types include sour dough, hops barm and sake barm. They are rather specific in the use, for example, in baking bread, to fit a rich formula only, or to fit a lean formula only, without any one so versatile to fit many different recipes.

Also, they suffer from disadvantages in that it takes 3 to 4 days to prepare, and that the processes are complicated.

SUMMARY OF THE INVENTION

The present inventors have made extensive investigations in an attempt to overcome these disadvantages and have accomplished this invention.

This invention provides a process of manufacturing barm for bakery and pastry products characterized by mixing alcohol-freed beer solution with koji (steamed rice grains moulded with starch-hydrolyzing filamentous fungi) and incubating the mixture at 20° to 30° C.

The process of manufacturing is as follows:

Alcohol is removed from beer, for example, by heating. The beer can be condensed by direct heating. In general, it is preferable to condense the beer by heating after adding water. The extent of condensation is not necessarily restricted, but should be sufficient to remove alcohol from the beer. Alternatively, beer may be condensed to a sufficient extent and then water can be added for dilution. The temperature for condensation as mentioned above is preferably in a range from 60° to 90° C.

Koji is subsequently added to the beer solution thus prepared, and the mixture is incubated. Koji of any type, for example, moulded with *Aspergillus oryzae*, can be used. For instance, the Koji can be prepared in a conventional manner, e.g., by inoculating steamed rice with *Aspergillus oryzae*. The mixture of the beer solution and the Koji is then added to a medium and incubated in the medium at a temperature of 20°-30° C. to produce barm.

The medium for barm manufacture may contain water, grated apples, onions, sugar, table salt, and boiled potato infusion along with cereal flours such as wheat, rye and rice, and mashed potatoes (dry).

Control of incubation temperature is important because the barm turns sour when the temperature is over 30° C. or under 20° C. and gives an undesirable taste and scent to the final products in which such barm is used. The time of incubation is preferably in the range from 12 to 24 hr.

PREFERRED EMBODIMENTS OF INVENTION

A process of this invention is concretely illustrated below. Modifications are possible within the scope of this invention.

To 100 parts by weight of commercially available beer, 100 parts by weight of water are added, and the mixture is condensed to about 100 parts by weight by heating at 60° to 90° C. to allow evaporation of alcohol and a part of water for preparation of a condensed solution of beer. After cooling the condensed beer solution, 50-100 parts by weight of Koji are added thereto to prepare a beer-Koji solution. Thereafter, the beer-Koji solution is added to the medium, stirred well, and incubated for a time of 12-24 hours at a temperature of 20° to 30° C. to prepare the barm.

When the barm manufactured by the process of this invention is used, bread of any type from rich or lean formula can be produced desirably, showing good brightness in the crust, thin crumb grain, peculiarly good taste and flavour, and less staling in time lapse after baking.

Also, the same effect appears in pastry products such as steamed buns, cookies, sponge cakes and butter cakes.

A few examples are described for further illustration of this invention.

EXAMPLE 1

To 100 parts (W/W) of commercially available beer, equal parts (W/W) of water were added. The mixture was condensed to 100 parts (W/W) by heating at 60° C. To this condensed beer solution, 50 parts (W/W) of koji were added. The barm was prepared by adding 50 parts (W/W) of wheat flour, 150 parts (W/W) of cooked rice and 100 parts (W/W) of water to this beer-koji solution and incubating the mixture for 18 hr. at 26° C.

EXAMPLE 2

To 100 parts (W/W) of commercially available beer, equal parts (W/W) of water were added. The mixture was condensed to 100 parts (W/W) by heating at 75° C. To this condensed beer solution, 75 parts (W/W) of koji were added. The barm was prepared by adding 50 parts (W/W) of wheat flour, 150 parts (W/W) of cooked rice and 100 parts (W/W) of water to this beer-koji solution and incubating the mixture for 16 hr. at 24° C.

EXAMPLE 3

To 100 parts (W/W) of commercially available beer, equal parts (W/W) of water were added. The mixture was condensed to 100 parts (W/W) by heating at 60° C. To this condensed beer solution, 100 parts (W/W) of koji were added. The barm was prepared by adding 50 parts (W/W) of wheat flour, 150 parts (W/W) of cooked rice and 100 parts (W/W) of water to this beer-koji solution, and incubating the mixture for 12 hr. at 28° C.

EXAMPLE 4

To 100 parts (W/W) of commercially available beer, equal parts (W/W) of water were added. The mixture was condensed to 100 parts (W/W) by heating at 90° C. To this condensed beer solution, 50 parts (W/W) of koji were added. The barm was prepared by adding 150 parts (W/W) of cooked rice and 100 parts (W/W) of water to this beer-koji solution, and incubating the mixture for 15 hr. at 25° C.

EXAMPLE 5

The barm was prepared according to Example 2 except that the incubation temperature was varied as specified in Table 1.

Bread was prepared according to the formulas and conditions specified below with the barm prepared as above.

[Baking of rich-formula roll bread by sponge-and-dough method]

(a) Formulas

| Sponge | (parts, W/W) | Dough | (parts, W/W) |
|---|---|---|---|
| Wheat flour | 75 | Wheat flour | 25 |
| Sugar | 2.5 | Sugar | 18 |
| Whole eggs | 18 | Table salt | 0.35 |
| Yeast | 3 | Skim-milk, dry | 1.5 |
| Yeast food | 0.1 | Yeast | 0.3 |
| Barm | 15 | Margarine | 12 |
| Water | 7 | Water | 15 |

(b) Baking conditions

| | |
|---|---|
| Sponge mixing time | 2 min. at low speed and 2 min. at medium speed |
| Sponge mixing temperature | 26–27° C. |
| Sponge fermentation time | 90 min. at 27° C. and 80% relative humidity |
| Dough mixing time | 2 min. at low speed and 9 min. at medium speed |
| Dough mixing temperature | 29–30° C. |
| Floor time | 55 min. at 27° C. and 80% relative humidity |
| Split portion weight | 60 g |
| Bench time | 25 min. |
| Proof time and temperature | 50 min. at 38° C. and 85% relative humidity |
| Baking time and temperature | 10 min. at 220° C. |

[Baking of lean-formula loaf bread by straight method]

(a) Formula

| | (parts, W/W) |
|---|---|
| Wheat flour | 100 |
| Yeast | 2 |
| Yeast food | 0.1 |
| Barm | 15 |
| Table salt | 2 |
| Sugar | 5 |
| Margarine | 5 |
| Water | 50 |

(b) Baking conditions

| | |
|---|---|
| Dough mixing time | 2 min. at low speed and 10 min. at medium speed |
| Dough mixing temperature | 29–30° C. |
| Fermentation time | 60 min. at 27° C. and 80% relative humidity |
| Split portion weight | 450 g |
| Bench time | 15 min. |
| Proof time and temperature | 50 min. at 38° C. and 85% relative humidity |
| Baking time and temperature | 25 min. at 220° C. |

The results are summarized as shown in Table 1.

The following criteria were employed for the general rating in Table 1.

Very good: Volume is large; crumb texture is soft with thin crumb grain; shortness of texture is good in eating quality Good: Volume is somewhat smaller; crumb texture is less soft with thicker crumb grain; shortness is less good in eating quality Poor: Volume is small; crumb texture is not soft with thick crumb grain; shortness of texture is not good in eating quality

EXAMPLE FOR COMPARISON

Baking test, according to the test No. 8 of Example 5 (in Table 1), was carried out to compare the cases with the barm of this invention, with commercially available hops barm, with conventional sake barm, and without any barm at all.

The results are summarized as shown in Table 2 (rich-formula roll bread by sponge-and-dough method) and Table 3 (lean-formula loaf bread by straight method).

TABLE 2

| Barm | Volume (cc) | Number of tasters who answered "good" at 1 hr. after baking | Number of tasters who answered "good" at 48 hrs. after baking |
|---|---|---|---|
| Of this invention | 315 | 17/30 | 21/30 |
| Hops barm | 240 | 0/30 | 2/30 |
| Sake barm | 305 | 8/30 | 7/30 |
| None | 300 | 5/30 | 0/30 |

TABLE 3

| Barm | Volume (cc) | Number of tasters who answered "good" at 1 hr. after baking | Number of tasters who answered "good" at 48 hrs. after baking |
|---|---|---|---|
| Of this invention | 1940 | 19/33 | 24/33 |
| Hops barm | 1930 | 9/33 | 9/33 |
| Sake barm | 1820 | 1/33 | 0/33 |
| None | 1950 | 4/33 | 0/33 |

What we claim is:

1. Process of manufacturing barm for bakery and pastry products which comprises mixing alcohol-freed beer solution with Koji and incubating the mixture at a temperature of 20°–30° C.

2. The process according to claim 1 wherein the Koji is prepared by inoculating steamed rice with *Aspergillus oryzae*.

* * * * *

TABLE 1

| | Barm preparation | | Volume of | | Volume of | |
|---|---|---|---|---|---|---|
| Test No. | Incubation temperature (°C.) | Incubation time (hr.) | rich-formula roll bread (cc) | General rating | lean-formula loaf bread (cc) | General rating |
| 1 | 15 | 12 | 240 | Poor | 1820 | Poor |
| 2 | 20 | 12 | 285 | Good | 1950 | Good |
| 3 | 30 | 12 | 300 | Very good | 1960 | Very good |
| 4 | 35 | 12 | 320 | Very good | 1980 | Very good |
| 5 | 40 | 12 | 240 | Poor | 1780 | Poor |
| 6 | 15 | 24 | 245 | Poor | 1800 | Poor |
| 7 | 20 | 24 | 320 | Very good | 1900 | Good |
| 8 | 30 | 24 | 315 | Very good | 1950 | Very good |
| 9 | 35 | 24 | 290 | Good | 1910 | Good |
| 10 | 40 | 24 | 230 | Poor | 1810 | Poor |
| 11 | 15 | 30 | 245 | Poor | 1820 | Poor |
| 12 | 40 | 8 | 240 | Poor | 1830 | Poor |